L. SNOW & J. HASELTINE.
Children's Carriages.

No. 145,692.

Patented Dec. 16, 1873.

WITNESSES
Frank L. Parker
John J. Haley

INVENTORS
Leonard Snow
John Haseltine

UNITED STATES PATENT OFFICE.

LEONARD SNOW AND JOHN HASELTINE, OF BOSTON, MASSACHUSETTS.

IMPROVEMENT IN CHILDREN'S CARRIAGES.

Specification forming part of Letters Patent No. 145,692, dated December 16, 1873; application filed January 20, 1873.

*To all whom it may concern:*

Be it known that we, LEONARD SNOW and JOHN HASELTINE, both of Boston, in the county of Suffolk and State of Massachusetts, have invented certain new and useful Improvements in Children's Carriages, of which the following is a specification:

This invention consists in the combination of certain springs with the axle, as will be fully described hereafter.

Figure 1:
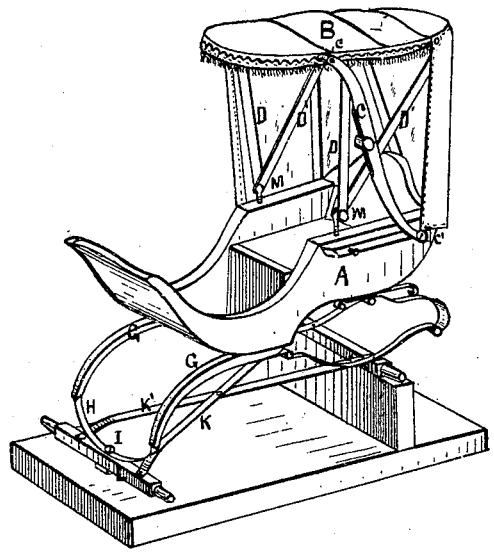
Figure 2:
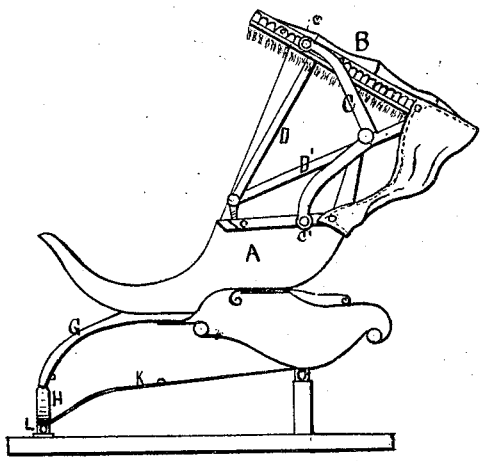

Figure 1 is a perspective view. Fig. 2 is an elevation of the same.

The forward axle L is connected to the rear axle by the cross-straps K and K', which are made of thin metal, and, being crossed, as shown, serve as braces, and yet do not interfere with the rocking motion of the axle. H is a curved spring, united at its ends to the sills G G, as shown in Fig. 1, and to the axle at I. This method of securing the forward axle leaves it free to rock, and gives an easy spring to the forward part of the carriage.

We claim as our invention—

The springs K, K', and H and axle L, combined as described, and for the purpose set forth.

LEONARD SNOW.
JOHN HASELTINE.

Witnesses:
FRANK G. PARKER,
JOHN J. HALEY.